Figure 1:
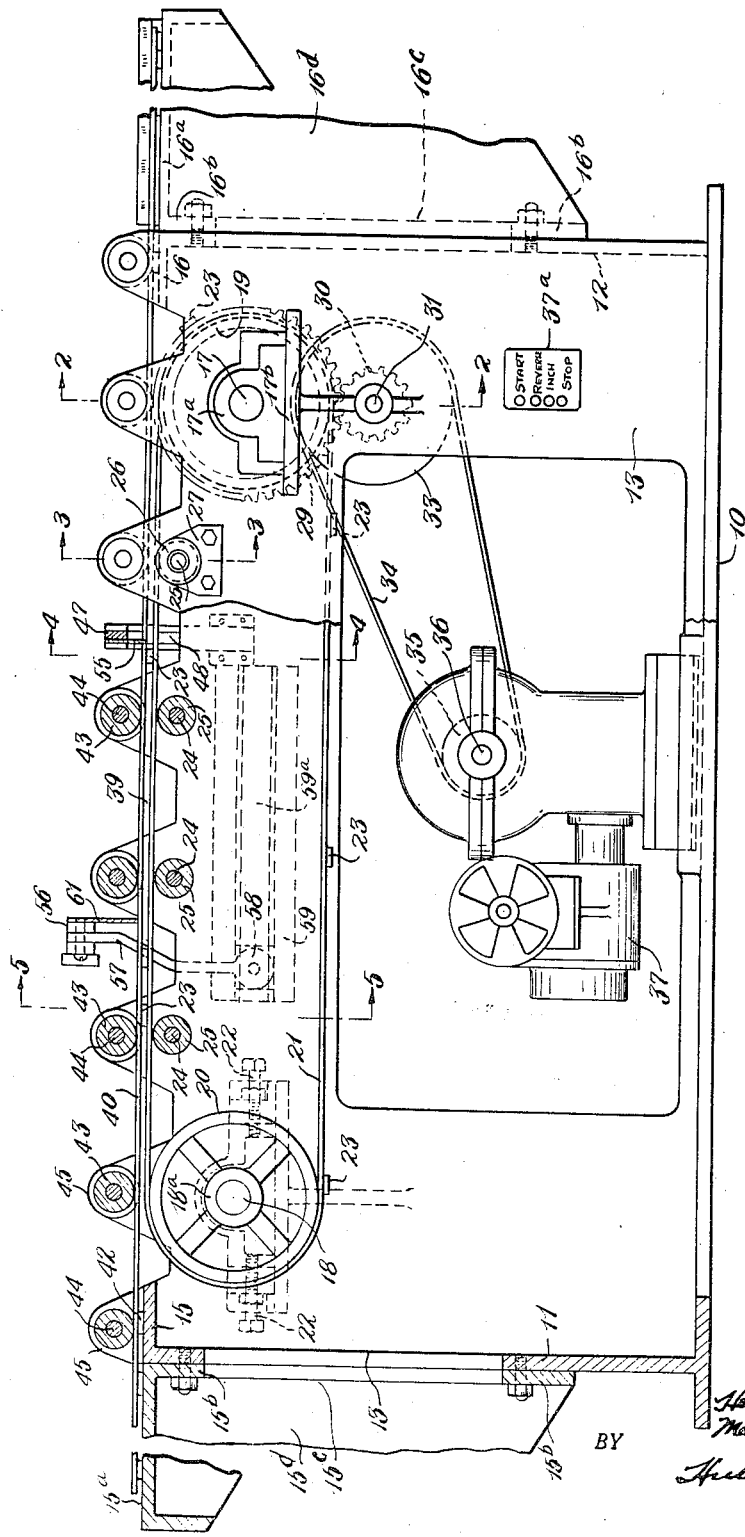

Jan. 10, 1950  H. H. FELDSTEIN ET AL  2,494,233
MACHINE FOR FACILITATING CHANGES IN ARRANGEMENT
OF STRIPS OR CARDS ON PAGE CARD FILES
Filed May 1, 1946  6 Sheets-Sheet 1

INVENTORS
Henry H. Feldstein
Marc J. Feldstein
BY
Hull & West
ATTORNEYS

Jan. 10, 1950 H. H. FELDSTEIN ET AL 2,494,233
MACHINE FOR FACILITATING CHANGES IN ARRANGEMENT
OF STRIPS OR CARDS ON PAGE CARD FILES
Filed May 1, 1946 6 Sheets-Sheet 2

INVENTORS
Henry H. Feldstein
BY Marc J. Feldstein
Hill West
ATTORNEYS

Jan. 10, 1950     H. H. FELDSTEIN ET AL     2,494,233
MACHINE FOR FACILITATING CHANGES IN ARRANGEMENT
OF STRIPS OR CARDS ON PAGE CARD FILES
Filed May 1, 1946     6 Sheets-Sheet 3

INVENTORS
Henry H. Feldstein
Marc J. Feldstein
BY
Hull & West
ATTORNEYS

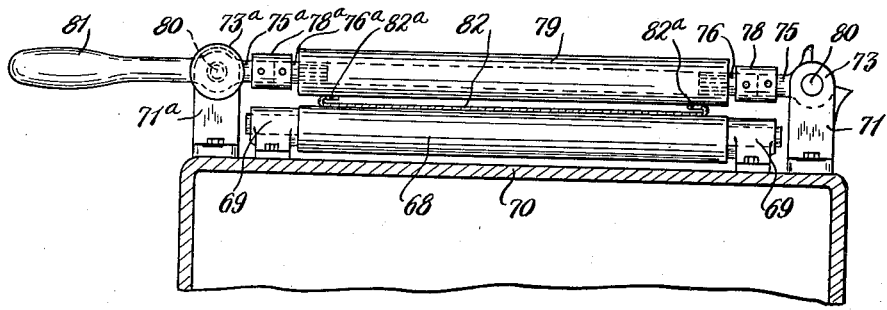
FIG. 14
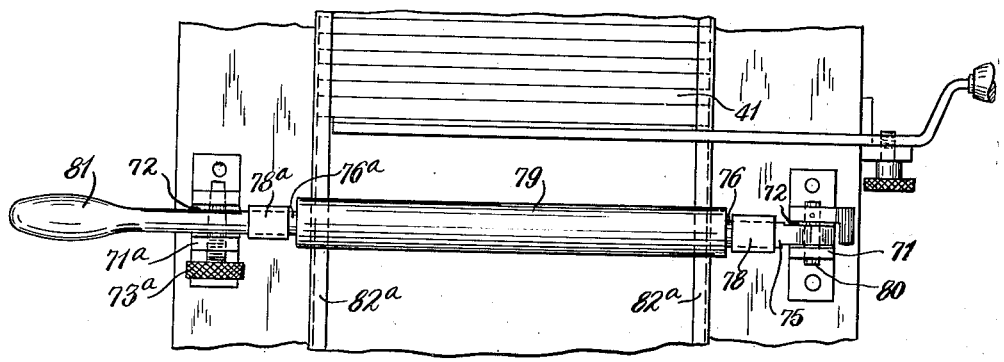
FIG. 15
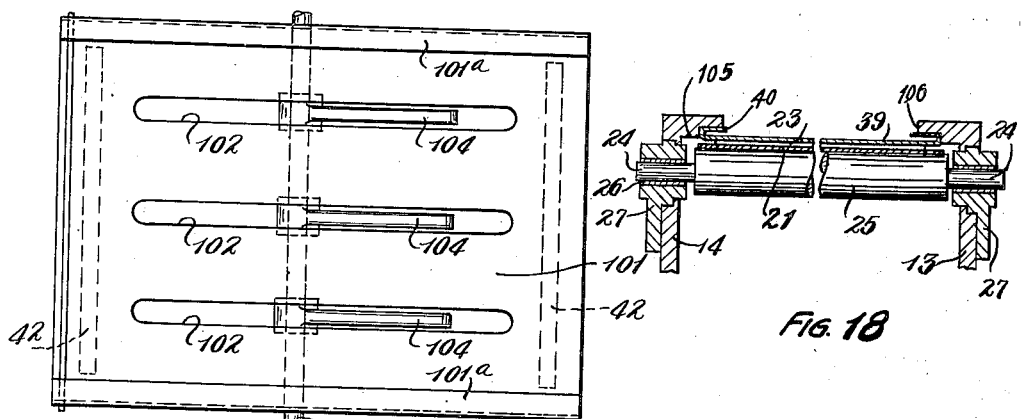
FIG. 16
FIG. 18
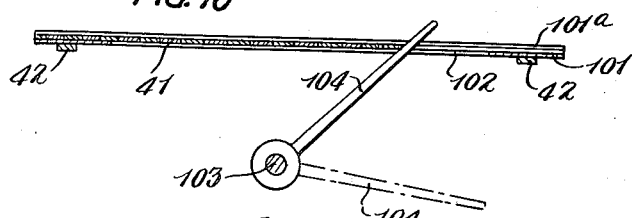
FIG. 17

Patented Jan. 10, 1950

2,494,233

UNITED STATES PATENT OFFICE 2,494,233

MACHINE FOR FACILITATING CHANGES IN ARRANGEMENT OF STRIPS OR CARDS ON PAGE CARD FILES

Henry H. Feldstein, Cleveland, Ohio, and Marc J. Feldstein, Arlington, Va.

Application May 1, 1946, Serial No. 666,344

26 Claims. (Cl. 40—64)

This invention relates to means for facilitating the making of changes in and additions or deletions to data-bearing strips or cards on visible page card files of the type wherein the said strips are removably mounted on bases (usually in the form of plates) and each of which bases, with the data-bearing strips or cards thereon, is of such size as to enable the same to constitute a page of a record which can be made by reproducing photographically, or by any photo-offset technique, the matter contained on the said bases. Bases or plates of this character have been used as a basis for the preparation of directories or listings wherein changes in and additions or deletions to said data occur during the intervals between reprinting or reproduction of the matter on said bases or plates.

In practice, these changes have been effected by removing by hand the strips of cards to be deleted and by inserting the strips of cards to be added thereto. This operation frequently results in changing the number of strips or cards on at least some of the bases or plates and requires, for the purpose of neatness of appearance for the final reproduction, rearrangement of all successive strips or cards on the page card files, in order to prevent gaps between lines or crowding of the upper or lower margins of the page card files. Time and effort required for manual rearrangement of the strips or cards on the successive plates and the possibility of errors in the order of the strips or cards, frequently make this technique difficult of application.

Where this re-arrangement of strips or cards on the base of any page card file results in exceeding its capacity, we are enabled to transfer such excess mechanically to the base of a page card file immediately adjoining the same; also to facilitate the operations of additions to or deletions of, the strips of cards on said bases. The continuity in relation of the page card files in our apparatus enables the above results to be accomplished expeditiously.

Figure 7:
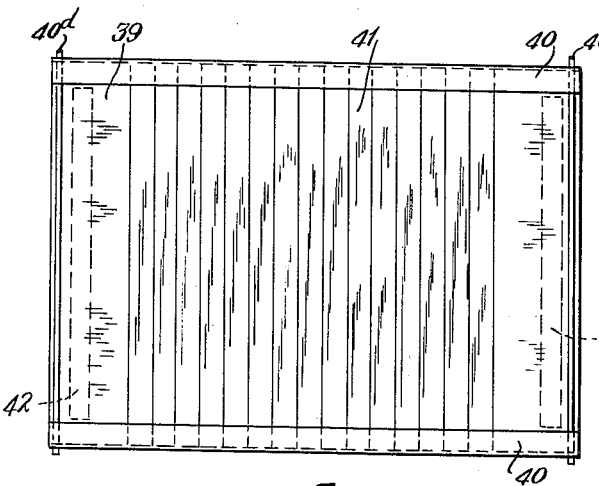
Figures 8, 9, 10:
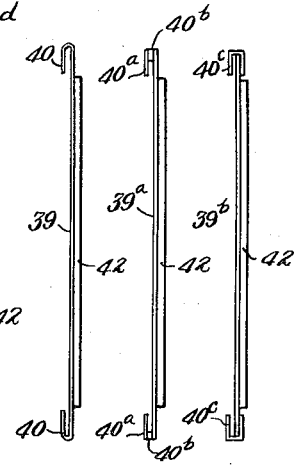
Figure 11:
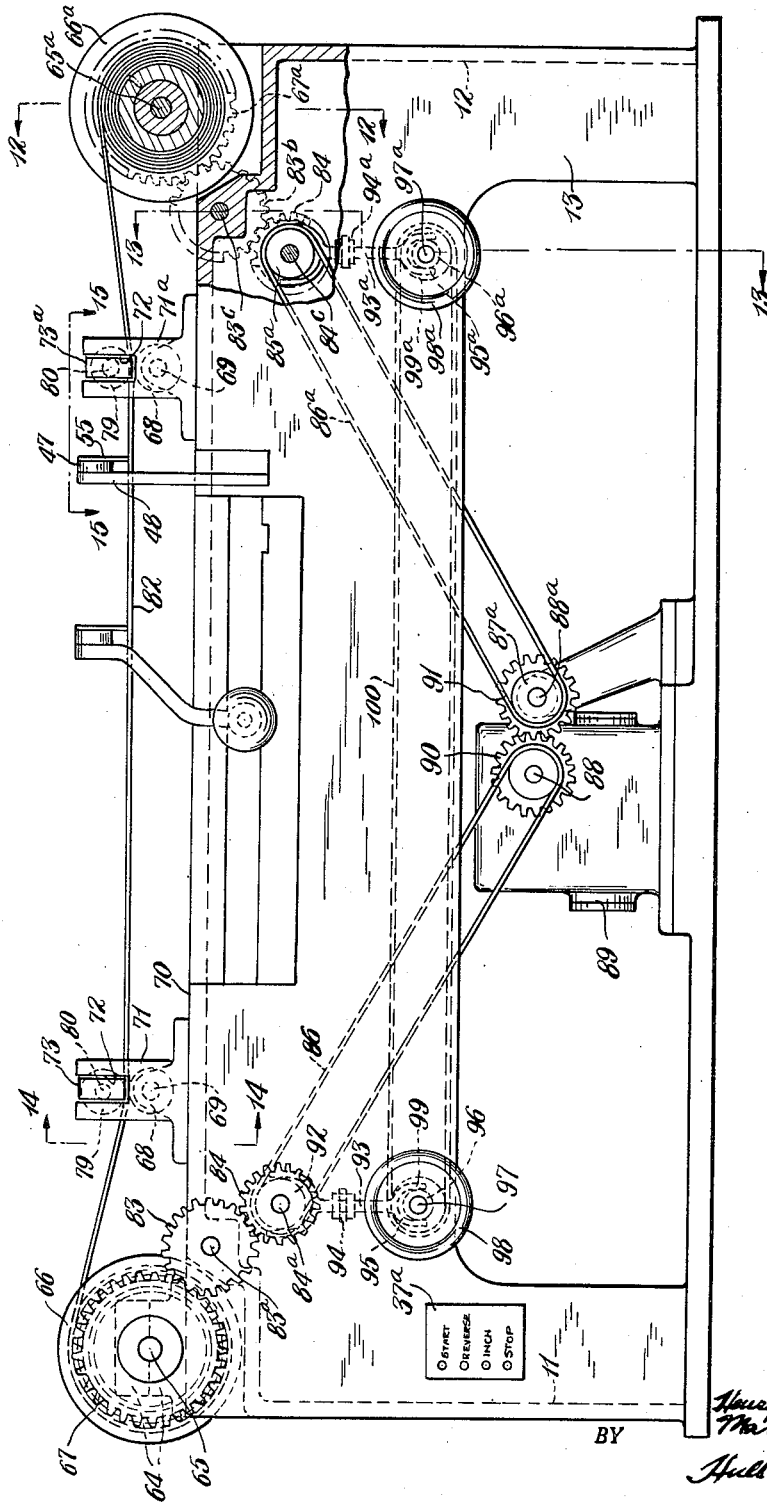
Figure 12:
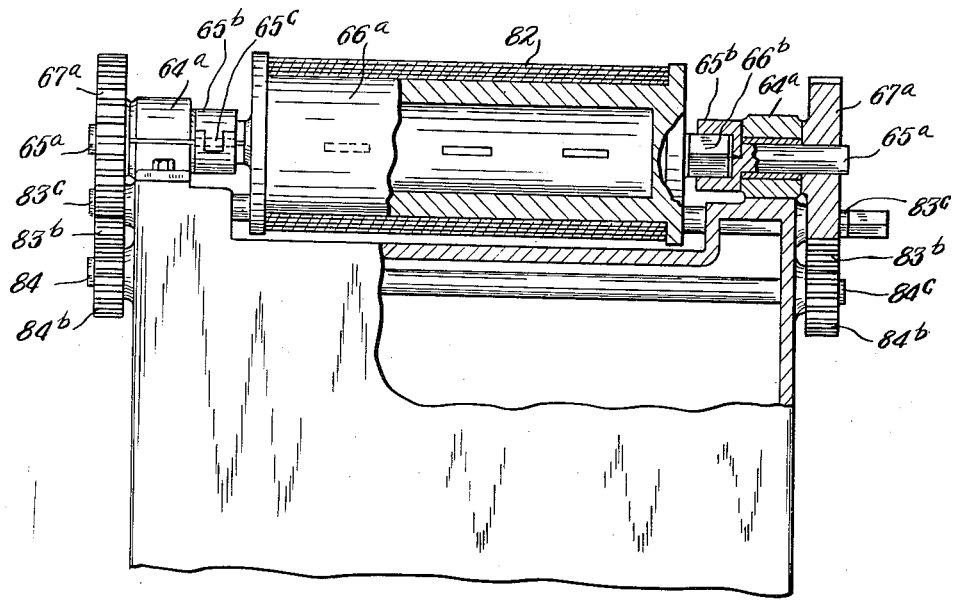
Figure 13:
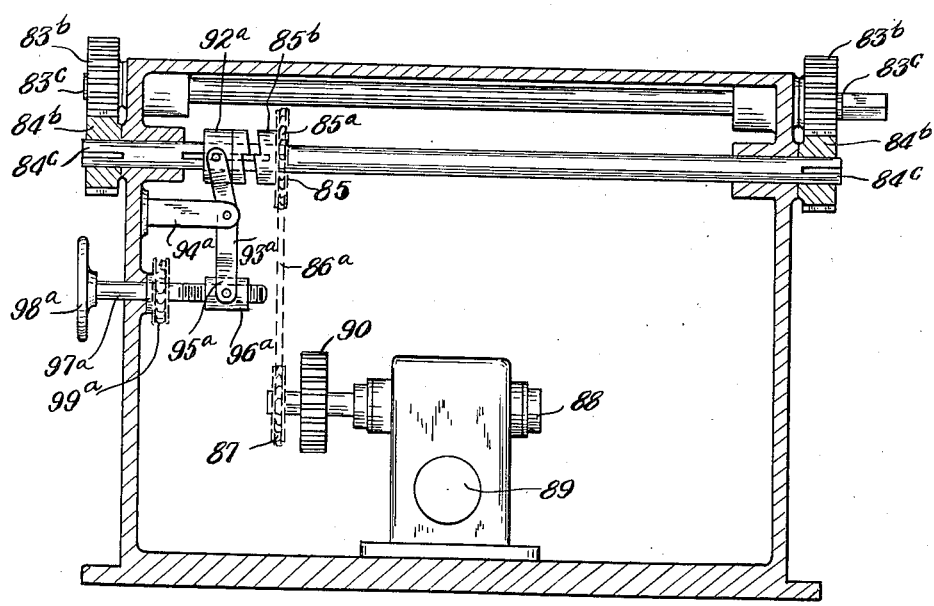

The manner in which the foregoing results and other results to be set forth in detail hereinafter may be accomplished mechanically will be described in connection with the accompanying drawings wherein Fig. 1 represents a somewhat diagrammatic view, in side elevation and with parts broken away, of a machine for accomplishing the objects of our invention; Figs. 2, 3, 4 and 5 are details in section corresponding respectively to the lines 2—2, 3—3, 4—4 and 5—5 of Fig. 1, looking in the directions of the arrows applied to said lines, the lower roller being omitted from Fig. 5; Fig. 6 is a detail in section taken on the line 6—6 of Fig. 5 and looking in the direction of the arrows; Fig. 7, a plan view of one of the plates or bases on which the machine shown in the preceding views operates; Fig. 8 is an end elevation of the plate or base shown in Fig. 7; and Figs. 9 and 10 are end elevational views of modifications of the aforesaid plate or base; Fig. 11 represents a somewhat diagrammatic view, in side elevation and with parts broken away, of a modification of the machine shown in Fig. 1 and illustrating the manner in which it operates upon a continuous base for data slips or cards; Fig. 12 is a sectional elevational view, the section being taken on the line 12—12 of Fig. 11; Fig. 13 is a sectional elevational view taken substantially on the line 13—13 of Fig. 11; Fig. 14 is a sectional view corresponding to the line 14—14 of Fig. 11; Fig. 15 is a plan view taken substantially on the line 15—15 of Fig. 11; Fig. 16 is a plan view of a modified form of base or plate; Fig. 17 is an end elevational view of the plows which cooperate with the slots of said plate; and Fig. 18 is a view similar to Fig. 3 showing a modification of the means for holding down the side flanges of the page card files and for preventing lateral shifting of the same.

Describing the parts first by reference to Figs. 1–10, 10 denotes the base, 11 the front wall, 12 the rear wall, and 13 and 14 the side walls, the said side walls being shown as having large openings therein and the front and rear walls being shown as supporting the top of the table which is provided with table-top sections 15 and 16. In order to form a proper support for the data bearing bases or plates, the front section 15 is provided with an extension 15ª forming part of an assembly having upper and lower cross members 15ᵇ and vertical struts 15ᶜ by which the said assembly is secured, as by means of bolts to the front upper end of the table, the extension 15ª being braced by side members 15ᵈ extending downwardly therefrom to the bottom of the assembly. A similar assembly is secured to the rear wall 12 and consists of an extension 16ª of the section 16, upper and lower cross members 16ᵇ, vertical struts 16ᶜ and side braces 16ᵈ.

Figure 2:
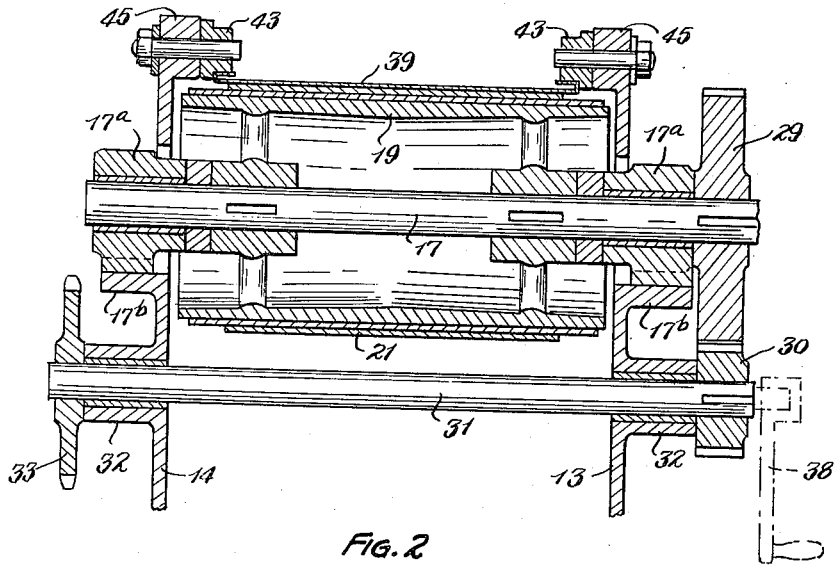
Figure 3:
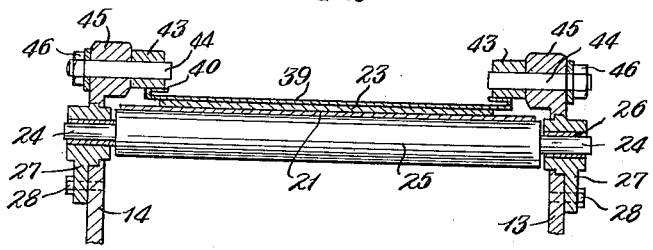

17 and 18 denote shafts, located respectively adjacent to the rear and the front end of the table, and these shafts are supported in bearings 17ª and 18ª, respectively, the supports for the shaft 18 being identical with the supports for the shaft 17, shown in Fig. 2. Base flanges 17ᵇ extend outward from the front and rear sides of the table. Secured to each of these shafts 17 and 18 is an elongated pulley or conveyor 19 and 20, respectively. These pulleys support jointly an endless belt 21, and the shaft for the pulley 20 is shown as provided with means comprising screws 22 whereby the shaft and its bearings may be adjusted, thereby to maintain sufficient tension upon the belt. The belt is provided at suitable intervals with driver strips 23 secured thereto and extending transversely thereof.

24 denotes shafts for rollers 25. These shafts are journaled in bearings 26 (see Figs. 1 and 3) carried by plates 27, detachably secured to the sides 13 and 14 by screw bolts 28. These rollers support the upper stretch of the belt 21.

The shaft 17 is provided with a gear 29 meshing with a pinion 30 on a shaft 31 journaled in bearings 32 carried by the sides 13 and 14. One end of the shaft 31 is provided with a sprocket 33 whereby the shaft may be driven by a chain 34 from a sprocket 35 on the shaft 36 of a speed reducer which is driven by the shaft of an electric motor 37, the controls for which are indicated at 37ª. Where it is impossible, or unnecessary, to drive the belt 21 by power, it may be driven manually by means of a handle 38 on the end of the shaft 31 which is opposite that to which the sprocket 33 is shown as secured.

The bases for the strips or cards as shown in Figs. 1–10 comprise plates 39, each provided with inturned flanges 40, thereabove and on opposite sides thereof, between which flanges data-bearing strips 41 are inserted, as shown in Figs. 6 and 7, and each of which plates, with the data strips thereon, forms a basis for a page to be produced by the photographic process referred to hereinbefore.

The bottom of each plate 39 is provided with one or more driver strips 42 secured thereto and extending transversely thereof and which strips are adapted to be engaged by the driver strips 23 on the belt 21.

Cooperating with the rollers 25 are rollers 43 mounted on shafts 44 journaled in bosses 45 carried by the upper ends of the sides 13 and 14; the shafts being detachably mounted in said bosses and held therein by nuts 46. These rollers overhang the inturned flanges 40 and are so positioned as to retain the driver strips 42 in position to be engaged by the driver strips 23 on the top stretch of the belt 21 and to guide the bases 39.

In order to enable the insertion and deletion of strips on the plates 39, we employ what we designate a "stationary plow" and a "movable plow" which are supported for vertical movement with respect to said plates and are adapted to be brought into such proximity to the upper surfaces of said plates, between the inturned flanges thereof, as to engage a side of a strip or card which is to be removed and/or arranged or deleted, to permit the insertion of one or more strips or cards in lieu thereof; also to arrest the forward or rearward movements of the strips or cards on the plates as the latter are moved forwardly or rearwardly beneath the said plows, thereby to automatically effect a transfer of excess strips or cards from one plate to one or both of the plates immediately adjacent thereto, thereby preventing gaps between the strips or cards (with corresponding gaps between the lines on the printed reproductions thereof) as well as preserving the proper allocation of strips or cards upon the page card file without crowding the upper or lower margins of the page plates.

Figure 4:
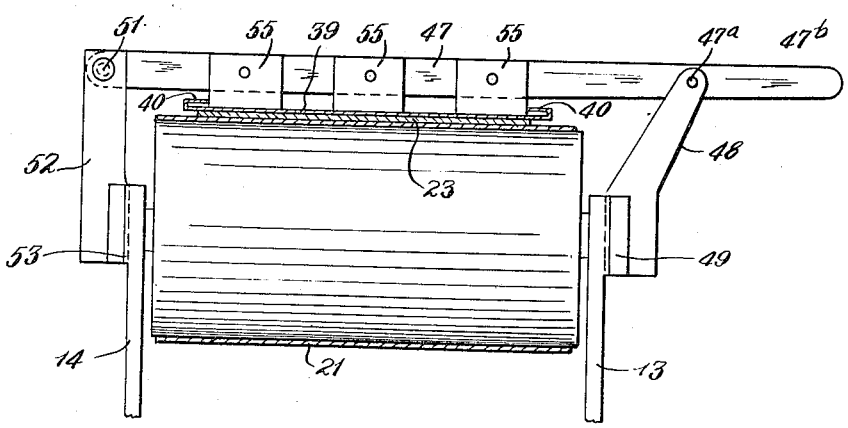

As shown more particularly in Figs. 1 and 4, an arm 47 is pivotally connected at 47ª to the upper end of a vertical arm 48, the base of which is supported by a bracket 49 on the side 13. The arm 47 is provided with a handle extension 47ᵇ beyond its pivotal connection with the arm 48 and its opposite end is detachably connected, by means of a removable pin 51, with a vertical arm 52 carried by a bracket 53, similar to the bracket 49. Secured to and projecting downwardly from the arm 47 are the blades 55 of the plow.

With the parts occupying the positions shown in Fig. 4, the bottoms of these blades are in close proximity to or in light engagement with the upper surface of the plate 39 therebeneath and in position to intercept the strips on the said plate as the latter is moved forwardly or rearwardly by the belt 21.

By removing the pin 51, the arm 47 may be swung upwardly, thereby to move the plow blades away from operative relation to the strips on the plates.

56 denotes the arm for the second plow, the said arm being pivotally mounted on a shaft 56ª on the upper end of an arm 57 which is adjustably secured to the side 13 by means of a stud 58 having a frusto conical head 58ª adapted to be received within a dove-tailed slot 59ª provided therefor in a guide plate 59 extending longitudinally of and secured to one of the sides 13 of the table. The outer end of this stud is threaded for the reception of a knurled cap 60. The arm 56 is provided with plow blades 61, which may be brought into and out of operative relation to the upper surface of the plate therebeneath by means of the handle 56ᵇ, the said arm being elevated when desirable by depressing the handle, and being retained in such position by a ratchet 62 on the pivot shaft 56ª and a pawl 63 on the portion of the handle adjacent to said shaft.

In Figs. 9 and 10, we have shown a modification of the inturned flange construction whereby strips or cards may be removably retained upon the base sections.

In Fig. 9 the flanges 40ª are made separate from the base 39ª, spacing of the flanges from the outer sides of the base 39 being obtained by the insertion of spacing elements 40ᵇ secured in any suitable manner to the said flanges and to the outer sides of said base.

In Fig. 10, the inturned flanges 40ᶜ are the upper flanges of channeled strips the lower flanges of which are secured in any suitable manner to the under surfaces of the sides of the base 39ᵇ.

With the parts constructed and arranged as described, the operation will be as follows, it being noted that the length of the table top and the space between the pulleys 19 and 20 will preferably be sufficient in actual practice to accommodate some four base card files arranged in continuity upon the belt 21. Where it is necessary to make changes in the arrangement and number of cards or strips on the base of any of the said files, it is advisable to insert between the vertically spaced rollers adjacent to the pulley 19, the page card file wherein these changes must be made, and also to insert thereafter between the vertically spaced rollers adjacent to the pulley 19 two or more page card files which immediately follow in sequential order the one whereon the changes are to be made. Each of the page card files has a line on the base thereof indicating the bottom of the space reserved at the top of said file for heading purposes. The stationary plow will be dropped at a point where it will engage at such line the base of the file to be operated upon and the forward movement of the belt 21 will be suspended until the necessary changes in the strips or cards shall have been effected. In the event that strips or cards shall have been deleted in excess of the strips or cards inserted, the belt 21 will be driven slowly forwardly while the stationary plow holds back the strips or cards until those remaining are gathered together. In such case, the front of the file base which has been engaged at the heading line by the stationary plow will have been moved forwardly beyond such line. The unoccupied space near the front of the base can then be filled by depressing the movable plow to bring its blade onto the base of the next succeeding file, thereby to hold the strips or cards while the first file is moved rearwardly back to its original position. By this operation, the movable plow will have transferred enough strips from the base succeeding the one which has just been moved rearwardly to completely fill the latter base from the rear thereof up to the bottom of the heading space.

If, on the other hand, the changes which have been made in the strips or cards upon the base of a file are such as to exceed the page capacity of the said base, in order to provide room for this surplus, some strips or cards must be transferred to the base of the file next succeeding. The movable plow can be utilized for the purpose of assisting in the transfer of the surplus strips or cards, from the rear of the base of the file whose capacity has been exceeded, upon the base of the next succeeding file and this transfer will, if there have not been a sufficient excess of deletions over insertions on the succeeding file base to balance this surplus, result in pushing the overflow strips or cards onto the base of the second succeeding file. The stationary plow is lifted and the movable plow is brought into contact with the base below at the desired point. The belt is moved forward and the movable plow will push the strips or cards onto the succeeding file base, thus creating room for the surplus.

When the insertions have all been made and the surplus strips or cards disposed of as described, the movable plow is also elevated and the belt driven forwardly until the next succeeding file passes beyond the stationary plow. The forward movement of the belt is stopped whereupon either the stationary plow or the movable plow may be lowered, thereby to intercept the strips or cards and by moving the belt rearwardly the surplus strips or cards will be transferred to the base of the file to be photographed. This procedure of transferring the surplus strips or cards from the base of one page card file to the base of the next succeeding page card file can be repeated until such time as the excess of strips or cards on the bases of preceding files are compensated by uncompensated deletions of strips or cards from a succeeding file or until the accumulating excess can be accommodated by the addition thereof to the final page card file or upon such additions to such former final page as may be necessary. This process continues until all the strips or cards on the base files to be photographed are arranged consecutively adjacent to each other. Both plows are then lifted, the file to be photographed is brought into a position just in the rear of the stationary plow, the plow is lowered and the forward movement of the belt will bring the strips or cards into contact with the plow, and the base file is moved until the line showing the space for the heading (mentioned previously) will be under the stationary plow. The file is then ready to be photographed. It will thus be seen that the manner in which the two plows cooperate with the movements imparted to the belt 21 greatly facilitates the deletions of and insertions to the bases of page card files and enables a rearranged number of strips or cards to be aligned automatically and mechanically upon each base. It will also be seen that our apparatus effects a substantial saving of time and effort in the manner of preparing publications, such as directories or listings for periodic reproduction.

While the movable plow can be utilized in such manner as to serve the function of the stationary plow as well as to assist by its movement in the transfer of strips or cards from the base of one page card file to the base of an adjacent page card file, more efficient results can be obtained by employing both plows.

Each base file is provided with bars $40^d$ inserted through opposed channels at the front and the rear of the strips or cards, thereby to retain the same in place and enable the files to be supported in vertical position.

In Figs. 11–16 there is shown a modification of the apparatus illustrated in the preceding views, wherein the parts of the table and the parts of the apparatus which are identical with those shown in the preceding views are designated by the same numerals that are employed for designating these parts in said preceding views, it being noted that the table is not provided with extensions corresponding to the extensions $15^a$ and $16^a$ since such extensions are unnecessary in order to accommodate the mounting of the various parts of the apparatus.

64, $64^a$ denote split bearings for the trunnion bearing 65, $65^a$ of drums 66 and $66^a$, each of which trunnion bearings has on one end thereof a hinged split bearing as shown at $65^c$ on Fig. 12 and which bearings receive the squared journals of the drums, as shown at $66^b$ on Fig. 12. By unclamping these bearings, the drums can be readily removed from and replaced in the machine. The split bearings are mounted on opposite sides of the end of the machine, the said shafts having gears 67, $67^a$ on the opposite ends thereof.

68 denotes rollers which are journaled in bearings 69 mounted on the table top 70, one pair of said bearings being adjacent to the drum 66 and the other pair of said bearings being adjacent to the drum $66^a$. Mounted externally of each pair of bearings 69 are brackets 71, $71^a$ extending above the bearings 69 and provided with slots 72 extending downwardly from the tops thereof for the reception of the disk-like supports 73, $73^a$ for the outer sections 75, $75^a$ of stub shafts, the inner sections 76, $76^a$ whereof are connected to the outer sections by means of sleeves 78, $78^a$ and the said inner sections projecting into the outer ends of rollers 79 which are located directly above the roller 68. The disk-like supports 73 are supported within the respective slots provided therefor by means of journal pins 80, and one of these disk-like supports for each roller is shown as provided with an operating handle 81 by means of which the rollers may be tilted about the journal pins adjacent to said handle thereby to lift the rollers from engagement with the inturned flanges $82^a$ on the integral base 82 of a plurality of page card files, the said base being in the form of a film or ribbon, which is wound upon the drums 66, 66ᵃ and which normally passes between the rollers 68 and 79, with its said flanges engaged by the rollers 79 while the base travels along the lower rollers 68. The manner of supporting the rollers 79 from the stub shafts enables the parts to be quickly disassembled should occasion require such action.

Figure 5:
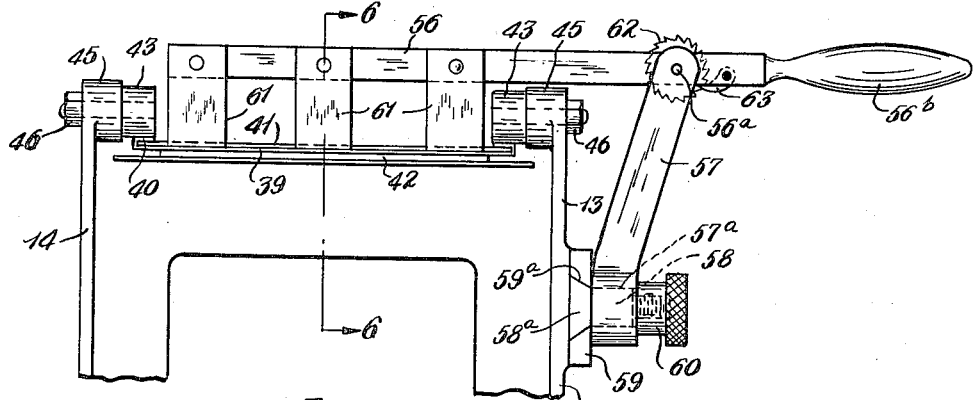
Figure 6:
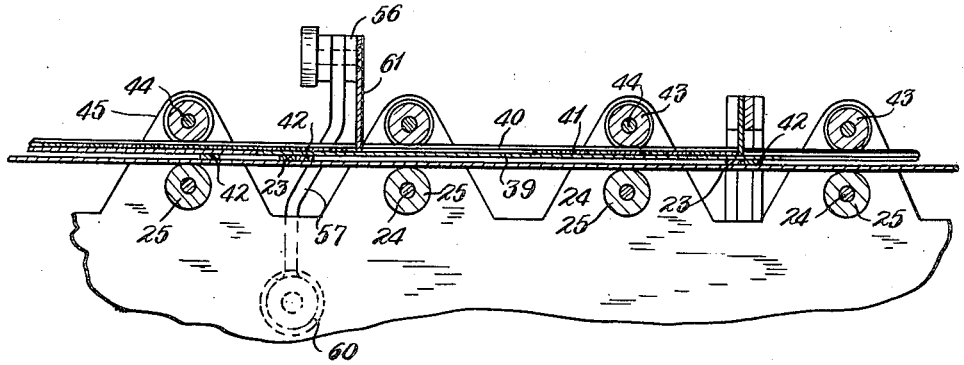

Cooperating with the strips 41 which are insertable beneath the flanges 82ᵃ are plows (see Figs. 11 and 16) preferably identical with and supported in the same manner as those described hereinbefore and illustrated more particularly in Figs. 1, 4 and 5. The plows and the supporting means therefor which are employed with both forms of our apparatus are designated by the same reference characters.

One of thde gears 67 is shown as meshing with a gear 83 on the shaft 83ᵃ and the latter gear with a gear 84 on a shaft 84ᵃ, the arrangements of the shafts with the gears on both ends thereof being identical with the arrangement of the gears 67ᵃ on the shaft 65ᵃ and the gears 83ᵇ on the shaft 83ᶜ and the gears 84ᵇ on the shaft 84ᶜ, on Figs. 12 and 13. Each of these shafts 84ᵃ and 84ᶜ has a sprocket 85, 85ᵃ respectively thereon, the construction and arrangement of the parts on the shaft 84ᵃ being identical with the construction and arrangement of the parts on the shaft 84ᶜ, as shown in Fig. 14.

By reference to Figs. 11 and 13, it will be noted that sprockets 85, 85ᵃ are mounted upon clutch hubs, the clutch hub 85ᵇ for the sprocket 85ᵃ being shown as loose upon its shaft 84ᶜ, the sprockets 85 and 85ᵃ being connected by chains 86, 86ᵃ, respectively, with sprockets 87, 87ᵃ respectively, on shafts 88 and 88ᵃ, respectively, the former shaft being driven through reduction gearing from a motor shaft 89, and the latter shaft being driven by the shaft 88 through gears 90 and 91 on the shafts 88 and 88ᵃ, respectively. By referring to Figs. 11 and 13, it will be seen that each of the shafts 84ᵃ and 84ᶜ has a clutch collar slidably keyed thereto, one of these clutch collars 92ᵃ being shown more particularly in Fig. 13. Each clutch collar is moved by a yoke 93, 93ᵃ, respectively, pivotally supported intermediate of its ends by an arm 94, 94ᵃ, respectively, said arms being secured at their outer ends to the wall 13, as will appear more particularly from Fig. 14. The lower end of each arm is formed into a yoke 95, 95ᵃ respectively, pivotally connected to internaly threaded sleeves 96, 96ᵃ, respectively, mounted upon the threaded end of posts 97, 97ᵃ, respectively, and each provided with an operating wheel 98, 98ᵃ, respectively. The posts 97 and 97ᵃ are provided each with a sprocket 99, 99ᵃ, respectively (see Figs. 11 and 14) and these sprockets are connected by a chain 100. This enables the operator, by utilizing either of the hand wheels 98, 98ᵃ to engage either clutch while disengaging the other, thereby to reverse the direction of movement of the page base 82.

With the parts constructed and arranged as shown and described, the plows may be lifted from engagement with the upper surface of the strip or card base 82; assuming that it is desirable to move the strip base forwardly and that the drum 66ᵃ is the one employed for such movement, power will be applied to the said drum 66ᵃ, through shaft 83, gears 90, 91, shaft 88ᵃ, chain 86ᵃ, and sprockets 85ᵃ and 87ᵃ; the sprocket 85ᵃ being operatively connected to the shaft 84ᶜ through the clutch mechanism described, and thence through shaft 84ᶜ and gears 84ᵇ and 83ᵇ to gear 67, the sprocket 85 at this time being disengaged from the shaft 84ᵃ. Except for the fact that the base comprises continuous or integral sections, instead of discontinuous but abutting page sections, the manner in which the apparatus will be operated to enable the changes in the arrangement of the strips or cards to be accomplished, will be substantially identical with the maner in which the machine set forth in Figs. 1 to 7 is operated, it being noted that where continuous page sections are employed, each page section is identified by number and by the spacing thereon between the top of the same and the bottom of the next preceding page section. Where changes have been effected in the arrangement of strips or cards on one of the page sections and which changes do not affect the number and arrangement of strips or cards on any succeeding or preceding page section and where no change in arrangement of strips is required on a number of page sections, the page card files may be wound with fair rapidity upon the drum 66ᵃ until such time as the page section requiring rearrangement of strips thereon shall have been fed from the drum 66.

In both embodiments of our invention, the page file sections may be moved forwardly or rearwardly as rapidly or as slowly as desired, or their movements stopped entirely for as long a period as desired, due to the controls with which the motor is provided.

Furthermore, by providing either or both of the shafts 83, 83ᵃ, with a handle-receiving extension such as shown at 83ˣ on Fig. 12, the apparatus may be operated by hand in order to impart the desired movements to the continuous base for the page card files.

As a modification of the means for utilizing plows in connection with my page card files, we may employ the construction shown in Figs. 16 and 17 wherein the base 101 of each of the page card files is provided with the usual inturned flanges 101ᵃ and with longitudinal slots 102. 103 denotes a shaft journaled on opposite sides of the table below the positions occupied by the page card files and below the belt on which the page card files are conveyed. The said shaft has arms 104 thereon adapted to be projected upwardly, first into the forward ends of the slots 102, and may thereafter be moved rearwardly as desired. Where a belt is employed as a means for conveying the page card files, it will obviously be necessary to provide the belt with slots registering with the slots 102.

In lieu of the rollers 43 for engaging the inturned flanges on the opposite sides of the bases of the page card files, we have shown in Fig. 18 the sides 13, 14 provided each at its upper end with a stepped flange extending inwardly therefrom, the lower members 105 of the said flanges being adapted to engage the sides of the inturned flanges 40 while the upper members 106 of the said flanges are extended inwardly beyond the lower members and overhang and engage the tops of the flanges 40. In Fig. 18 there is also shown one of the rollers 25 on which the belt 21 is supported.

While we have shown our machine or apparatus as equipped with one or more plows, it can be used without any plow, the re-arranging of the strips or cards being effected by hand assisted by the controllable movement of the page card files.

In the embodiment of our invention shown in

Figs. 1–10, the drivers 23 on the belt 21 and the cooperating driver strips 42 on the bottoms of the base plates 39 ensure continuity between the bases of adjacent page card files. If desired, the adjacent ends of said files may be positively connected, as by dovetailed projections and corresponding dovetailed recesses on the abutting ends of said files.

Having thus described our invention, what we claim is:

1. An apparatus of the character specified comprising a plurality of rollers and means for supporting the same in spaced relation for rotary movement about their respective axes, a plurality of other rollers and means for supporting the same for rotary movement about their respective axes and vertically above the respective first mentioned rollers, the lower rollers comprising means for supporting for movement between the upper and lower rollers a plurality of page card files each comprising a base having its sides provided with inwardly projecting flanges overhanging the base and spaced therefrom and having data-bearing strips or cards inserted beneath said flanges and extending transversely across said base, and the upper rollers being so spaced from their respective lower rollers as to engage the said flanges, controllable means for moving the page card files between the upper and the lower rollers with the top of a succeeding page card file constituting an extension of the bottom of the next preceding page card file, a plow mounted for vertical movement toward and from a page card file therebeneath and adapted to be brought into close proximity to the upper surface of the base of said page card file and between the flanges thereof, thereby to engage the side of a card or strip on said surface.

2. An apparatus of the character specified comprising a plurality of rollers and means for supporting the same in spaced relation for rotary movement about their respective axes, a plurality of other rollers and means for supporting the same for rotary movement about their respective axes and vertically above the respective first mentioned rollers, the lower rollers comprising means for supporting for movement between the upper and lower rollers a plurality of page card files each comprising a base having its sides provided with inwardly projecting flanges overhanging the base and spaced therefrom and having data-bearing strips or cards inserted beneath said flanges and extending transversely across said base, and the upper rollers being so spaced from their respective lower rollers as to engage the said flanges, controllable means for moving the page card files between the upper and the lower rollers with the front of a succeeding page card file constituting an extension of the rear of the next preceding page card file, a plow mounted for vertical movement toward and from a page card file therebeneath and adapted to be brought into close proximity to the upper surface of the base of said page card file and between the flanges thereof, thereby to engage the side of a card or strip on said surface, and a second plow mounted for vertical movement toward and from page card files therebeneath and for movement longitudinally of the bases of said page card files.

3. In the apparatus set forth in claim 1, the first mentioned rollers being of a length substantially equal to the entire width of each page card file and the rollers comprising the other plurality of said rollers being short rollers supported in pairs above the flanges on opposite sides of the page card files and of sufficient length to engage the said flanges throughout substantially their entire width.

4. In the apparatus set forth in claim 1, the controllable means for moving the page card files between the upper and lower rollers comprising a belt having a stretch thereof extending beneath and in close proximity to the bottoms of the bases of the page card files, the bottoms of the said page card files and the upper surface of the stretch of said belt being provided with interengageable driving means, and the controllable means being utilized for driving the said belt.

5. In the apparatus set forth in claim 2, the controllable means for moving the page card files between the upper and lower rollers comprising a belt having a stretch thereof extending beneath and in close proximity to the bottoms of the bases of the page card files, the bottoms of the said page card files and the upper surface of the stretch of said belt being provided with interengageable driving means, and the controllable means being utilized for driving the said belt.

6. An apparatus of the character specified comprising a plurality of rollers and means for supporting the same in spaced relation for rotary movement about their respective axes, a plurality of other rollers and means for supporting the same for rotary movement about their respective axes and vertically above the respective first mentioned rollers, the lower rollers comprising means for supporting, for movement between the upper and lower rollers, a plurality of page card files each comprising a base having its sides provided with inwardly projecting flanges overhanging the base and spaced therefrom and having data-bearing strips or cards inserted beneath said flanges and extending transversely across said base, and the upper rollers being so spaced from their respective lower rollers as to engage the said flanges, a pair of pulleys each of substantially the same length as the width of the said page card files and means for supporting the said pulleys, for rotary movement about their respective axes of rotation, respectively adjacent to the front and to the rear of the said apparatus, the distance between the axes of rotation of said pulleys being greater than the length of one of sad page card files, an endless belt supported by said pulleys and the upper stretch whereof extends across the top of and is supported by the lower rollers, the said belt having driving members attached to the exterior surface thereof and the page card files having corresponding driving members attached to the lower surfaces of the bases thereof whereby page card files may be conducted between the upper and lower rollers with the top of a succeeding page card file constituting an extension of the bottom of the next preceding page card file, controllable means for driving one of said pulleys, and a plow mounted for vertical movement toward and from a page card file therebeneath and adapted to be brought into close proximity to the upper surface of the base of said page card file and between the flanges thereof, thereby to engage the side of a card or strip on said base.

7. In the apparatus set forth in claim 6, a second plow mounted for vertical movement toward and from page card files therebeneath and for movement longitudinally of the bases of said page card files.

8. An apparatus of the character described comprising means for supporting thereon a plurality of page card files arranged in sequential order and each having data-bearing strips or cards extending across the base thereof with their ends inserted beneath flanges overhanging the sides of said base and controllable means for imparting movement to the supporting means, a plow comprising an arm adapted to extend above and across the bases of page card files on said supporting means, one or more blades on said arm adapted by the depression of the said arm to be brought into substantial engagement with the bases of the page card files therebeneath, a guideway below the said supporting means and extending parallel therewith, an arm pivotally connected to the first mentioned arm and extending downwardly therefrom and having it lower end slidably mounted in said guideway, and means for supporting the first mentioned arm in various positions to which it may be adjusted about its pivotal connection with the second arm.

9. In the apparatus set forth in claim 8, a plow, additional to the plow set forth in said claim, and movable vertically toward and from the bases of page card files therebeneath.

10. An apparatus of the character specified comprising a table, a plurality of pairs of vertically aligned bearings carried by said table and spaced apart longitudinally thereof, upper rollers and lower rollers journaled in said bearings, the said bearings and the rollers supported thereby being spaced apart longitudinally of said table, shafts supported by said table in front of and at the rear of the said bearings, a drum on each of said shafts and means for driving each of said shafts, the said drums having wound thereupon a continuous flexible base extending from the drum at the front of the table between the pairs of upper and lower rollers and to the rear drum, the said flexible base being provided with inturned flanges at opposite sides thereof by which the opposite ends of data-bearing cards or strips extending transversely of the said base are supported and upon which base they are grouped in paged relation, a plow supported for vertical movement between pairs of rollers and comprising an arm provided with one or more blades thereon extending transversely with respect to and above the portion of the continuous base therebelow and adapted to be brought into and out of engagement with the upper surface of said base, and means for supporting the said arm in elevated position with respect to said base.

11. In the apparatus set forth in claim 10, a second plow mounted for vertical movement toward and from page card files therebeneath and for movement longitudinally of the bases of said page card files.

12. An apparatus of the character specified comprising a table, a plurality of pairs of vertically aligned bearings carried by opposite sides of said table, upper rollers and lower rollers journaled in said bearings, an endless belt located below the said rollers and having its upper stretch supported upon the lower rollers of the said pairs and provided with driving members extending upwardly from its upper stretch, the said belt providing a support for a plurality of page card files each having means for removably supporting thereon strips or cards extending transversely thereof and each of the bases having driving members secured to the under sides thereof adapted to be engaged by the driving members on the said belt, and a plow movable toward and from the upper surfaces of said page card files and adapted to engage the sides of strips or cards thereon.

13. In the apparatus set forth in claim 12, a second plow mounted for vertical movement toward and from page card files therebeneath and for movement longitudinally of the bases of said page card files.

14. In the apparatus set forth in claim 2, the controllable means for moving the page card files including means for reversing the direction of movement of the said files along the lower rollers.

15. In the apparatus set forth in claim 10, the means for driving each drum shaft comprising a gear on each of said shafts, shafts having gears connected thereto and meshing with the gears on the drum shafts, shafts having gears connected thereto and meshing with the gears on the section mentioned shafts, and means including clutch mechanism on the last mentioned shafts for driving the latter, and means for automatically rendering each clutch mechanism inoperative by the act of rendering the other clutch mechanism operative.

16. An apparatus of the character specified comprising a table, a plurality of pairs of vertically aligned bearings carried by said table and spaced apart longitudinally thereof, upper rollers and lower rollers journaled in said bearings, the said bearings and the rollers supported thereby being spaced apart longitudinally of said table, shafts supported by said table in front of and at the rear of the said bearings, a drum on each of said shafts and means for driving each of said shafts, the said drums having wound thereupon a continuous flexible base extending from the drum at the front of the table between the pairs of upper and lower rollers and to the rear drum, the said flexible base being provided with inturned flanges at opposite sides thereof by which the opposite ends of data-bearing cards or strips extending transversely of the said base are supported and upon which base they are grouped in paged relation, a plow supported for vertical movement between pairs of rollers and comprising an arm provided with one or more blades thereon extending transversely with respect to and above the portion of the continuous base therebelow and adapted to be brought into and out of engagement with the upper surface of said base, means for supporting the said arm in elevated position with respect to said base, the means for driving the drum shafts comprising a gear on each of said shafts, an electric motor, a shaft driven thereby and having a gear and a sprocket thereon, a shaft having a gear meshing with the gear on the motor driven shaft and also having a sprocket thereon, a shaft having a sprocket thereon and clutch mechanism for connecting said sprocket with and disconnecting it from its shaft, a chain connecting said sprockets, a gear on the shaft having the second sprocket thereon, and gearing connecting the gear on the last mentioned shaft with the gear on the drum shaft, a shaft having a gear thereon meshing with the gear on the other drum and also having a sprocket thereon and clutch mechanism for engaging and disengaging the sprocket therewith and a chain connecting the two last mentioned sprockets.

17. In the apparatus set forth in claim 16, means located adjacent to each of said drums for automatically operating the clutch mechanisms whereby one of the same will be engaged with its shaft by the disengagement of the other clutch mechanism from its shaft and vice versa.

18. An apparatus of the character specified comprising means for supporting for movement thereupon a plurality of page card files each comprising a base having its sides provided with inwardly projecting flanges overhanging the base and spaced therefrom and having data-bearing strips or cards inserted beneath said flanges and extending transversely across said base, devices spaced from and above the ends of said supporting means and overhanging and engaging the tops of the said flanges, controllable means for moving the page card files between the said engaging devices and said supporting means with the top of a succeeding page card file constituting an extension of the bottom of the next preceding page card file, and a plow movably associated with the apparatus for engagement with data-bearing strips and preventing movement of same with the page card files.

19. An apparatus of the character specified comprising a plurality of rollers and means for supporting the same in spaced relation for rotary movement about their respective axes, a plurality of other rollers and means for supporting the same for rotary movement about their respective axes and vertically above the respective first mentioned rollers, the lower rollers comprising means for supporting for movement between the upper and lower rollers a plurality of page card files each comprising a base having its sides provided with inwardly projecting flanges overhanging the base and spaced therefrom and having data-bearing strips or cards inserted beneath said flanges and extending transversely across said base, and the upper rollers being so spaced from their respective lower rollers as to engage the said flanges, controllable means for moving the page card files between the upper and the lower rollers with the top of a succeeding page card file constituting an extension of the bottom of the next preceding page card file, and a plow movably associated with the apparatus for engagement with data-bearing strips and preventing movement of same with the page card files.

20. An apparatus of the character described comprising means for supporting thereon a plurality of page card files arranged in sequential order and each having data-bearing strips or cards extending across the base thereof with their ends inserted beneath flanges overhanging the sides of said base, controllable means for imparting movement to page card files carried by the supporting means and removable stop means for engagement with the data-bearing strips for preventing movement of the same.

21. An apparatus of the character described comprising a frame, means positioned on said frame for engaging with a plurality of page card files and mounting them in definite relationship to said frame, endless drive means journaled on said frame in association with said mounting means, said endless means being provided with members protruding therefrom for engagement with page card files positioned by said mounting means so that movement of said endless means will move the page card files with relation to said frame, means for driving said endless means, a controllable plow member adapted to engage with data-bearing strips carried by the page card files, the data-strips being movable with relation to the page card files, and means for bringing said plow member into engagement with the data-bearing strips of page card files whereby the data-bearing strips can be retained in a stationary position with relation to said frame while said endless means and page card files associated therewith are moved with relation to said frame.

22. In apparatus as that defined in claim 21, an auxiliary plow member which is associated with said frame for movement along the longitudinal axis of said frame, said first plow member being fixedly positioned with relation to the longitudinal axis of said frame.

23. An apparatus for processing a page card file having a plurality of transversely directed data-bearing strips slidably carried thereby for positioning such data-bearing strips in desired portions longitudinally of the page card file, said apparatus comprising means for engaging with a page card file and mounting it for longitudinal movement, endless means in association with said mounting means, said endless means being provided with members protruding therefrom for engagement with a page card file positioned by said mounting means so that movement of said endless means will move the page card file longitudinally through said mounting means, means for driving said endless means, a plow member adapted to engage with data-bearing strips carried by a page card file engaged with said mounting means, said plow member being retained against movement with the page card file, and means for bringing said plow device into engagement with the data-bearing strips of a page card file whereby the data-bearing strips can be retained in a stationary position while said endless means and page card file associated therewith are moved with relation thereto.

24. An apparatus for processing a page card file having a plurality of transversely directed data-bearing strips adjustably carried thereby for positioning such data-bearing strips in desired portions longitudinally of the page card file, said apparatus comprising means for engaging with a page card file and mounting it for longitudinal movement, endless means positioned in association with said mounting means, said endless means being provided with members protruding therefrom for engagement with a page card file positioned by said mounting means so that movement of said endless means will move the page card file longitudinally through said mounting means, means for driving said endless means, a plow member adapted to engage with data-bearing strips carried by a page card file engaged with said mounting means, and a guide member positioning said plow member for limited movement longitudinally of the page card file whereby the page card file can be retained in a stationary position while said plow member and data-bearing strips are moved with relation to said file.

25. An apparatus for processing a page card file for positioning data-bearing strips in desired portions longitudinally of the page card file, the page card file having a base with sides provided with inwardly projecting flanges overhanging the base and spaced therefrom and having the data-bearing strips or cards inserted beneath the flanges and extending transversely across the base, which apparatus comprises means for engaging the lower edge portions of a page card file to support same, an overhanging flange member associated with and immediately above said means to form a unit therewith, said unit being of appreciable length and being adapted to have a page card file threaded thereinto with its flanges received in said unit, means for moving the page card file through said unit, and a plow adjustably associated with the apparatus adjacent said unit for engaging data cards carried by a page card file for effecting relative movement therebetween.

26. Apparatus as in claim 20 wherein said removable stop means comprises a transversely extending frame member, a plurality of plow blades secured to said frame member and extending downwardly therefrom, and adjustable supports for said frame member for positioning said plow blades in contact with or spaced from data-bearing cards on files positioned by the supporting means.

HENRY H. FELDSTEIN.
MARC J. FELDSTEIN.

REFERENCES CITED

The following references are of record in the file of this patent:

UNITED STATES PATENTS

| Number | Name | Date |
| --- | --- | --- |
| 1,435,081 | Rand | Nov. 7, 1922 |
| 1,574,931 | Powell | Mar. 2, 1926 |
| 1,673,787 | Fram et al. | June 12, 1928 |
| 1,835,002 | Birckmayer | Dec. 8, 1931 |